United States Patent [19]

Watanabe et al.

[11] 4,195,843
[45] Apr. 1, 1980

[54] SIMPLIFIED MOTOR ASSEMBLY AND RELATED ELECTRICAL CONNECTION IN A SOUND REPRODUCING DEVICE

[75] Inventors: Katsumi Watanabe; Yutaka Shiseki, both of Kawasaki; Eishi Koike, Sagamihara, all of Japan

[73] Assignee: Ozen Co., Ltd., Tokyo, Japan

[21] Appl. No.: 928,800

[22] Filed: Jul. 28, 1978

[30] Foreign Application Priority Data

Mar. 31, 1978 [JP] Japan .................................. 53-37867
Apr. 12, 1978 [JP] Japan .................................. 53-42877

[51] Int. Cl.² .............................................. G11B 3/00
[52] U.S. Cl. .................................................. 274/1 A
[58] Field of Search ............ 274/1 A, 1 R, 9 R, 13 R, 274/15 R

[56] References Cited

U.S. PATENT DOCUMENTS

| | | | |
|---|---|---|---|
| 3,721,449 | 3/1973 | Sirinek ................................ | 274/1 A |
| 3,823,946 | 7/1974 | Nakajima ............................ | 274/1 A |
| 4,004,815 | 1/1977 | Watanabe ............................ | 274/1 A |

*Primary Examiner*—Harry N. Haroian
*Attorney, Agent, or Firm*—Basile and Weintraub

[57] ABSTRACT

The casing of a sound reproducing device defines the upper and lower bearings for directly receiving a shaft of a driving motor, as well as the outer shell for enclosing the rotor of the motor. This arrangement provides a motor assembly without the need for separate outer shell and separate brackets which are ordinarily indispensable with motors. The rotor hereof has a commutator being matingly electrically and slidably contractable with a pair of brushes fabricated from a metal wire. The free end of each wire comprises the brush, and the remaining portion thereof acts as a lead wire integral with the brush. The contact surfaces of the brushes and the commutator can be displaced or shifted by moving the two mating parts relative to each other for preventing defective starting due to poor electrical connection.

8 Claims, 3 Drawing Figures

SIMPLIFIED MOTOR ASSEMBLY AND RELATED ELECTRICAL CONNECTION IN A SOUND REPRODUCING DEVICE

BACKGROUND OF THE INVENTION

I. Field of the Invention

This invention relates to a sound reproducing device and, more particularly, to a sound reproducing device incorporating a motor assembly which is not housed in any separate housing and bracket, and a rotor of the motor is journaled by bearings provided in a casing of the device.

II. Prior Art

In many sound reproducing devices electric motors are used as the driving means for the turntable. Generally, electric motors of this kind include a permanent magnet, a rotor and a pair of brushes. Such motor assemblies are received in an outer shell or housing defined by a yoke and a stator comprising a front bracket and a rear bracket.

In view of the fact that the function of this kind of motor is to convert electrical energy into a rotational force and to transmit the rotational force of the rotor to other moving parts of the device, this function can be accomplished without the separate outer shell rear bracket which constitutes a stator assembly of the motor of ordinary construction, as long as there is still provided a rotor, a permanent magnet surrounding the rotor, brushes, bearings receiving the output shaft of the rotor and means for positioning the rotor and the permanent magnet.

Particularly in miniature sound reproducing devices for young children, compactness, light-weight and simplified construction of the entire device are highly desirable.

With respect to electric motors using a battery, or batteries, as the energy source, particularly miniature sized ones, the main cause of malfunction of toys incorporating such battery-type small electric motors is the non-starting during the switch-on operation.

In the art of sound reproducing devices, to which the present invention pertains, great numbers of small or miniature motors have been used, and the problems of non-starting or poor starting have been frequently encountered. The main cause of such problems of non-starting during "switch-on" is basically attributable to poor electrical contact between the mating surfaces of the brushes and commutator of the motor assembly.

This is because oftentimes very thin films of oxide or deposits of nonconductive foreign particles on either one or both of the surfaces of the brushes and/or commutator are formed. These films and/or deposits, in turn, disturb and/or prevent electrical conduction between the two mating parts.

It has now been found that electric motors which do not start rotation, even when the switch is "ON", can be started, without fail, if only the portions of contact between the two mating parts, i.e. the brush and commutator, are relatively displaced or shifted. It is believed that friction or shock, accompanying the displacement or shift of the contact portions, may remove the nonconductive material or oxide from the contact surfaces of the two mating parts.

However, in order to achieve displacement or shift, externally of the casing of the portion or area of contact between the brushes and commutator, of an electric motor having an outer shell and bracket surrounding both the rotor and brushes, it is necessary to alter the construction of the motor.

Heretofore, such design changes have been very difficult due to incompatible requirements between production costs and the troublesome assembly of modified parts and the parts of the motor proper. This invention aims to solve such problems in prior art sound reproducing devices.

STATEMENT OF OBJECTS

It is, therefore, an object of this invention to simplify the construction of the motor assembly of sound reproducing devices and, thereby, to make the entire device compact and of light weight.

It is another object of the invention to reduce the cost of sound reproducing devices by means of the simplified construction mentioned above.

A further object of the present invention is to eliminate non-starting at the time of switch-on.

A still futher object of the invention is to provide a motor assembly of simplified construction equipped with a starting device for positively preventing poor electrical contact.

A still more specific object of the present invention is to provide a positive motor starting device capable of being coupled with the other components of the sound reproducing device.

SUMMARY OF THE INVENTION

According to the present invention, the casing, per se, of a sound reproducing device serves as the bearings for journally receiving the output shaft of a motor, as well as a motor housing, for positioning the permanent magnet.

Hence, no particular stator is needed. The rotor of the present invention may be installed, while being exposed, in the housing of the sound reproducing device. Specifically, the commutator is constructed such that it may be correlated with other parts of the sound reproducing device.

A pair of brushes, constituting an important part of the motor, are fabricated of metal wire and are mounted on a chassis of the device so as to be electrically connected with a commutator of the motor. The brushes define two roles: first, as electrical brushes and, second, as lead wires in an electrical circuit.

Furthermore, the contact planes of the commutator with the brushes can be relatively displaced or shifted from outside the casing.

Accordingly, the entire construction and assembly of the device is simplified and, at the same time, problems in starting due to poor electrical connection are eliminated.

The brushes of the motor hereof are fabricated of metal wires or strips which may, also, act as lead wires. The wires are emplaced in the casing of the device and are arranged to resiliently contact the brushes.

In the above-mentioned construction, either one or both of the armatures of the brushes are supported and coupled to an actuating rod or lever such that at least one of the two parts can be displaced relative to the other.

The actuating rod is also rendered capable of being correlated with an "ON-OFF" switch to the power source. Hence, it becomes possible to displace the contact portion of the two parts upon switching the electrical source "ON" or at the start of the playing mode or cycle.

This type of actuating rod is suitable as a means for starting the motor for initiating sound reproduction. In other words, the acutating rod need be only directly or indirectly related to either the brushes or the commutator so that these two parts may be relatively displaced.

Also, the movement of the two parts may be either in an axial direction or in a direction crosswise or transverse to the axis of the armature.

Accordingly, the actuating rod may be arranged to move the output shaft of the motor in the axial direction thereof or may be mechanically connected to the shaft so as to displace it crosswise by utilizing a space existing between the shaft and the wall of the apertured bearing therefor.

Alternatively, the actuating rod can be connected to the brushes such that the rod may push the brushes in a direction crosswise thereto.

As can be seen from the above explanation, the casing of the sound reproducing device acts as both an outer shell and as a bracket for the motor assembly, thereby enabling the simplified stator construction.

Owing to the simplified construction, a sound reproducing device of the kind under consideration herein can be made compact with a concomitant lower weight together with a remarkable reduction in both production and transportation costs.

According to the present invention, both the commutator and brushes of the motor are relieved of oxide film or deposit of nonconductive foreign matters or particles by the friction and/or shock encountered at the contacting portion of the commutator and the brushes when the two mating parts are relatively moved or displaced. As a result, these two parts are always placed in a positive electrical contact. Hence, poor starting or non-starting due to defective electrical connection at these portions is prevented.

The positively secured starting device of this invention is operable by merely manipulating its actuating rod for relatively displacing the commutator and the brushes to change the portion of contact between the two parts. This simplified construction contributes to a sound reproducing device of excellent performance.

BRIEF DESCRIPTION OF THE DRAWING

For a more complete understanding of the present invention, reference is made to the following detailed description and accompanying drawing wherein like reference characters refer to like parts throughout the views, in which.

DETAILED DESCRIPTION OF THE PREFERRED EMBODIMENTS

Figure 1:
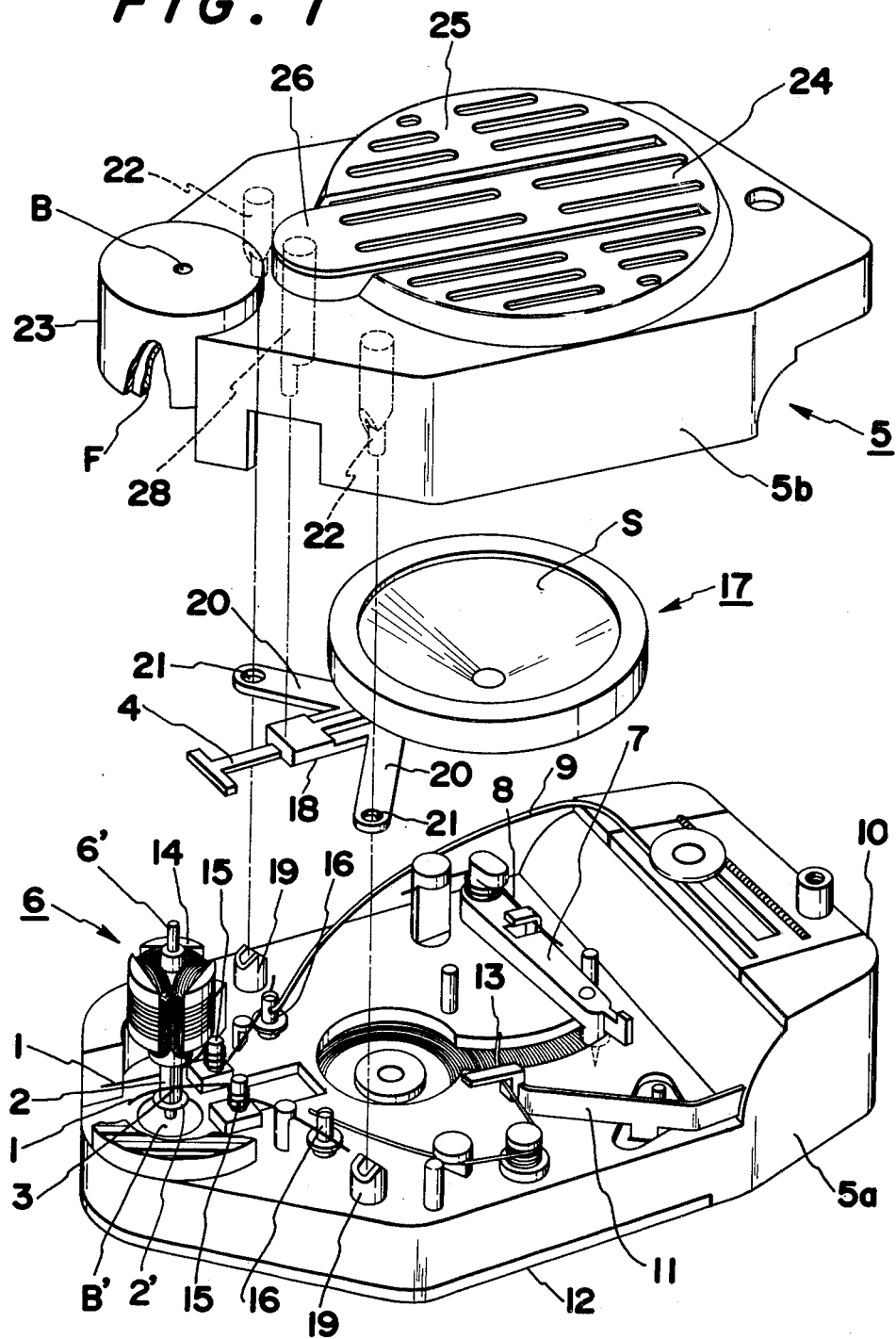
FIG. 1 is an exploded perspective view of a sound reproducing device of the present invention showing the relation between the pertinent components and parts.

Referring, now, to the drawing, a casing 5 for a sound reproducing device is defined by a chassis 5a and a mating housing 5b. The main components or parts of the device are mounted or provided on the chassis 5a.

Generally, the device hereof comprises a motor 6 which drives a pickup arm 7. Biasing means, such as a wire spring 8, biases the pivotally movable pickup 7 towards the starting position for sound reproducing, as well as upwardly toward the housing 5b. A lead wire 9, fabricated from metal wire having spring or resilient properties, extends from a power source to the motor. The resilient force of the lead wire 9 ensures electrical connection between the mating parts.

A battery magazine 10 houses the power source, such as a battery (not shown).

A contact switch 11 is associated with and operable in response to the opening or closing of a bottom lid 12. The lid 12 is used for changing a record disc to be played. The contact switch 11 cooperates and correlates with another contact switch 13. The switch 13 extends to the shut-off position of the sound reproducing device for interrupting the electrical circuit when the pickup 7 has reached the shut-off or terminating position.

It should be noted that the motor 6 used here is one of the so-called "exposed" types. This type of motor defines a known driving means for the kind of sound reproducing device under consideration herein. The rotor assembly 14 of the motor 6 includes a commutator 2 journaled by bearings B, B' which are integrally formed on the housing 5b and the chassis 5a, respectively onto an output shaft 6'.

A pair of brushes 1, 1 are fabricated of spring wire and form a part of the lead wires. One free end of each brush 1 is resiliently contacted with the commutator 2 such that an adjoining portion of the brush adjacent the contacting free end is resiliently supported by a corresponding brush mounting post 15. The other free end of the wire forming the brush is resiliently contacted with an intermediate terminal 16 provided on the chassis 5a.

The output shaft 6' of the motor 6 extends downwardly up to the level of turntable (not shown) under which is mounted the chassis 5a such that the turntable can be driven by the motor 6 through a conventional belt or a rim drive system.

The housing 5b of the casing 5 comprises a motor housing 23 and a speaker housing 24. The motor housing 23 receives therein an annular cylindrical permanent motor magnet F.

It should be noted that the permanent motor magnet F need not necessarily be received in any particular housing. Rather, it may be secured to any other suitable retaining means provided on the housing 5b.

Figure 2:
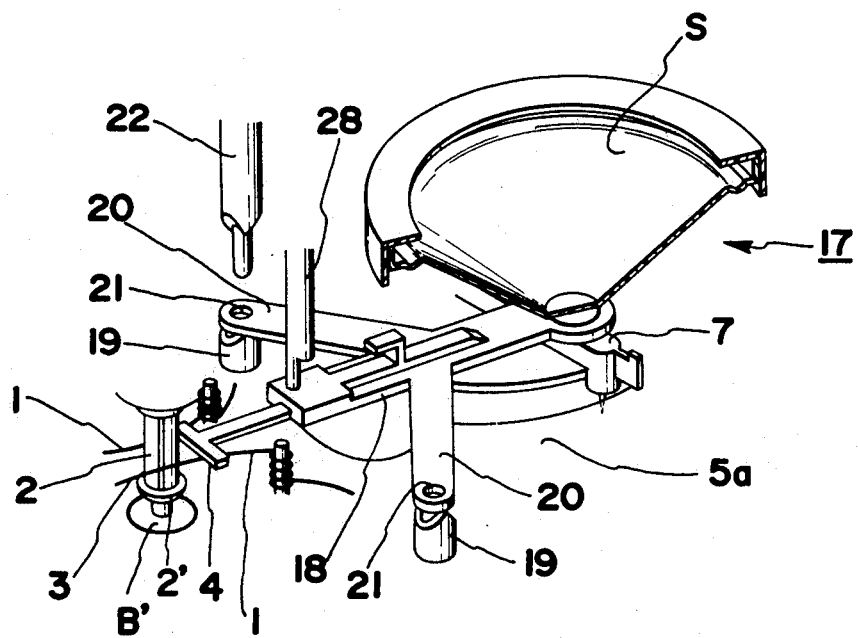
FIG. 2 is a perspective view showing the mounting of the speaker unit onto the chassis in accordance with the present invention.

The lower end of the commutator 2 is secured to the output shaft 6' by means of a mounting flange 2'. As shown in FIG. 2, the lower surface of the mounting flange 2' is provided with an inverted semispherical or conical configuration. When setting the rotor assembly 14 into the bearing, if the output shaft only is pushed down and inserted into the bearing B', the lower surface of the flange 2' can be moved downwards while pushing apart the brushes 1, 1 such that the brushes are separated from each other against their resilient force. Yet, both brushes will electrically contact with commutator 2 by virtue of their spring action. Because of the spring action, assembly of the motor can be readily conducted on a mass production scale.

As seen in FIG. 2, the speaker unit 17 of the present device is swingably supported on a sound transmitter rod 18. A pair of lateral arms 20, 20 extend from the rod 18 and are, also, swingably supported at their free ends by an aperture 21 formed on each arm 20. Each aperture defines a seat for a fulcrum post 19 provided on the chassis 5a. This seating enables a seesaw like swinging motion of the sound transmitter rod 18 itself, as well as the speaker unit 17 mounted thereon.

Each of the apertures 21, 21 has a dimension sufficient to leave a clearance between each of a pair of retaining posts 22, 22, which depend from the housing 5a and project into and are received in a mating aperture 21 to permit smooth swinging motion of the sound transmitter rod 18, but insufficient to permit escape thereof from the associated aperture 21. In this manner, the speaker unit 17 is mounted swingably on the chassis 5a. The transmitter rod 18 extends substantially along the path of the pickup 7 and resiliently urges the pickup 7 against a record disc (not shown) by means of another spring (not shown) to thereby assure the appropriate so-called stylus or needle pressure required for this type of sound reproducing device.

A brush actuating arm 4 is defined by a straight extension of the transmitter rod 18. The arm 4 is a T-shaped piece which is placed in proximity, but not in contact, with the brushes 1, 1 when the transmitter rod 18 is in a position being urged to the pickup 7.

When the housing 5b is mounted and assembled on the chassis 5a, the speaker S is received in the speaker housing 24. A face plate 25 is partly cut away by a continuous slit at its diametral central portion, except at one peripheral edge, to form a tongue-like flap 26 capable of being resiliently swung. From the bottom face of the flap 26 a transmitter rod actuating rod 28 depends. A tip end of the rod 28 approaches in proximity with, but slightly apart from, the upper surface of the brush actuating arm 4 such that the arm can be lowered from a position over the transmitter rod 18.

The location on the transmitter rod 18, at which the actuating rod abuts, is on the opposite side of the transmitter rod whereat the transmitter rod 18 urges the pickup 7, with respect to the fulcrum post 19, upon which the transmitter rod acts as a lever.

Consequently, upon depression of the flap 26 against its resilient force, to lower the actuating rod 28, the brush actuating arm 4 will be moved downward. This, in turn, will lower the brushes 1, 1. At the same time the opposite part of the transmitter rod, which urges down upon the pickup, will rise.

Furthermore, when the pickup 7 comes or stays at its shut-off or terminating position, the pickup 7 urges the switch 13 away from contact with the mating contact 11, thereby interrupting the electrical circuit to stop sound reproduction.

If an operator depresses the flap 26 and, thus, lowers the sound transmitter rod 18 through the actuating rod 28, the brush actuating rod 4 will, also, lower the brushes 1, 1 along the surface of the commutator 2, while keeping slidable contact therewith. Accordingly, the portion of electrical contact between the brushes and commutator is lowered and, at the same time, the pickup 7 is raised thereby to release the stylus of the pickup from engagement with a groove of the record disc. Because of the bias of the spring 8, the pickup 7 will automatically return to its initial or starting position of sound reproduction, and the contact switch 13 is placed "ON" so that the mating contact 11 is ready for starting the motor 6 to restart playing.

Figure 3:
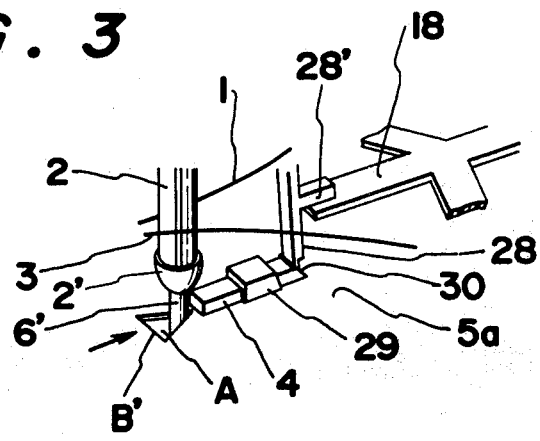
FIG. 3 is a perspective view showing an alternative embodiment of the present invention with respect to the bearing part.

FIG. 3 illustrates an embodiment wherein another type of brush actuating means 4 urges the brushes 1, 1 in a direction crosswise to the axial direction of the shaft of the commutator 2. In accordance herewith, if the output shaft 6' of the motor 6 and the turntable are connected by a belt, the shaft 6' is always pulled in a direction shown by the arrow. The bearing B', which receives the output shaft 6', may be formed as an aperture having an isosceles triangle configuration, which is widest at a portion close to the shaft and narrower towards the center of the turntable, and further to leave some clearance between the inside surface of the base side and the shaft 6', while the shaft is received by and being pushed against the tapered inside surfaces of the triangle. This bearing configuration has been found to be very suitable for restraining vibration of the motor assembly.

A guide 29 is disposed at a portion of the brush actuator 4, close to the center of the turntable with respect to the bearing B', to slidably guide reciprocal movement of the brush actuating rod 4. The front end of the rod 4, at the turntable side, has a slant surface which defines a sliding wedge face 30 which slidably engages the actuating rod 28 carried by the flap 26. Lowering of the actuating rod will, in turn, move the brush actuating rod crosswise against the shaft 6' for urging the shaft 6' away from the turntable.

The actuating rod 28 of this embodiment has a projection 28' provided on the side face confronting the forward end of the transmitter rod 18 for engagement therewith. Lowering of the rod 28, upon depression of the flap 26, releases the transmitter rod from keeping needle pressure for sound reproduction.

According to the embodiments of the present invention the motor assembly has no distinct separate outer shell and brackets, and the rotor and commutator are mounted in an exposed manner in the casing of the device, thereby not only simplifying the whole construction and assembly of the device, but also rendering ready incorporation of the means for displacing the contact surfaces between the commutator and the brushes.

This displacing means eliminates poor or nonstarting of sound reproduction.

Having, thus, described the invention, what is claimed is:

1. A sound reproducing device comprising:
   (a) a casing having a housing and a chassis;
   (b) an electric motor disposed on the chassis and comprising at least one brush and a commutator, the brush being in electrical mating contact with the commutator;
   (c) a turntable driven by the electric motor;
   (d) a pickup arm pivotally movably mounted on the chassis at one end thereof;
   (e) a stylus which is engagable with a groove of a record disc and which is carried at the lower face of the free end of the pickup arm;
   (f) means for normally biasing the pickup arm toward the initiating position of sound reproduction;
   (g) a speaker mounted on the pickup arm and being in contact therewith, the speaker being swingably carried by the pickup arm;
   (h) means for urging the pickup arm toward the face of the record disc;
   (i) a switch for actuating the electric motor; and
   (j) an actuating means coupled to the brush and commutator of the motor to enable relative displacement of the brush and commutator by a manipulating action from outside the casing, while maintaining electrical contact therebetween.

2. A sound reproducing device as claimed in claim 1 wherein the actuating means comprises a brush actuating rod which urges the brush in a direction parallel to the axis of rotation of the commutator.

3. A sound reproducing device as claimed in claim 1 wherein the actuating means comprises an actuating rod correlated with the commutator to urge the commutator in an axial direction thereof.

4. A sound reproducing device as claimed in claim 1 wherein the actuating means comprises a surface which is engageable with and urges the commutator in a direction crosswise to the axis thereof so as to move the commutator in a stroke defined by the clearance between an output shaft of the motor and an aperture of a bearing receiving the shaft.

5. A sound reproducing device as claimed in claim 1 which further comprises:
  (a) a transmitter rod actuating rod disposed in the casing and engageable with the actuating means; and
  (b) a flap formed in the casing and being resiliently swingable, the transmitter rod actuating rod being movable with the flap to engage the actuating means.

6. A sound reporducing device as claimed in claim 1 which further comprises:
  (a) a pair of brushes fabricated from a resilient metal having spring properties, the brushes resiliently contacting the commutator;
  (b) a plurality of posts or projections disposed on the casing and biasing the brushes toward the commutator;
  (c) bearings formed in the casing receiving the shaft of the motor; and
  (d) a retaining means formed integral with the chassis of the casing for securedly receiving therein a permanent magnet and a rotor of the motor which is surrounded by the permanent magnet.

7. A sound reproducing device as claimed in claim 6 wherein the retaining means is formed integral with the casing of the device.

8. A sound reproducing device as claimed in claim 6 wherein the commutator of the rotor is secured at the lower end thereof to the output shaft of the motor by a flange lower face having an inverted conical or semispherical configuration.

* * * * *